US006918303B2

(12) United States Patent
Casimiro et al.

(10) Patent No.: US 6,918,303 B2
(45) Date of Patent: Jul. 19, 2005

(54) BI-PLANAR DIFFERENTIAL PRESSURE TRANSMITTER WITH ORTHOGONAL PROCESS CONNECTIONS

(75) Inventors: Richard P. Casimiro, North Kingstown, RI (US); Steven D. Lantagne, Seekonk, MA (US)

(73) Assignee: Invensys, Foxboro, MA (US)

( * ) Notice: Subject to any disclaimer, the term of this patent is extended or adjusted under 35 U.S.C. 154(b) by 0 days.

(21) Appl. No.: 10/854,909

(22) Filed: May 27, 2004

(65) Prior Publication Data

US 2005/0034523 A1 Feb. 17, 2005

Related U.S. Application Data

(60) Provisional application No. 60/494,494, filed on Aug. 12, 2003.

(51) Int. Cl.[7] .................................................. G01L 7/00
(52) U.S. Cl. ....................................................... 73/706
(58) Field of Search .......................... 73/706, 715–727, 73/756; 137/343

(56) References Cited

U.S. PATENT DOCUMENTS 5,469,749 A * 11/1995 Shimada et al. .......... 73/861.47
6,038,927 A * 3/2000 Karas ........................... 73/706
6,279,401 B1 * 8/2001 Karas ........................... 73/716
6,484,587 B2 * 11/2002 Gul .............................. 73/756

* cited by examiner

Primary Examiner—William Oen
(74) Attorney, Agent, or Firm—Foley Hoag LLP

(57) ABSTRACT

A pressure transmitter apparatus includes a unitary body with two, normally vertical pressure passageways communicating respectively between opposed pressure openings extending normally horizontally through the body portion. A transducer for generating a differential pressure signal mounts on a transducer mounting element, coupled to the body portion and located above the pressure passageways. A pair of diaphragm elements can form first and second process diaphragms, closing first and second pressure openings. Flange elements overlie the diaphragm elements and are removably and replaceably secured to the body portion, having liquid drainage and gas purging passageways. A flame retardation element can be disposed within at least one of the pressure passageways. An overrange protection element can be integrally arranged with the unitary body portion to protect the transducer from overrange pressure fluctuations. Extensions on the flange elements afford a variety of mounting options, including mounting to industry standard pipe mountings.

52 Claims, 11 Drawing Sheets

BI-PLANAR DIFFERENTIAL PRESSURE TRANSMITTER WITH ORTHOGONAL PROCESS CONNECTIONS

CLAIM OF PRIORITY

This application claims priority to, and incorporates by reference, the entire disclosure of U.S. Provisional Patent Application No. 60/494,494, filed on Aug. 12, 2003.

FIELD

This application relates to process control devices, and, more particularly, to differential pressure transmitters.

BACKGROUND

Differential pressure transmitters measure the difference between two pressures and produce an output signal, typically with a display, responsive to the measurement. Differential pressure transmitters are commonly used in process control systems that require pressure measurements, or measurements of other variables associated with gases and liquids, e.g., flow rates. A typical differential pressure transmitter has two process diaphragms, each exposed to one of two fluid pressures that are to be compared, and has a transducer. An inert fill fluid is provided in a closed chamber between each process diaphragm and the transducer, to transmit pressures from the process fluids to the transducer. Each process diaphragm deflects in response to the pressure of one fluid, as applied from an input process line. The transducer responds to the difference between the two pressures of the process fluid, and produces electrical output signals for indication or control. Pressure transmitters that produce electrical output signals often include electronic circuitry to process the transducer signal and to display it by way of a read-out meter, and/or to apply the processed signal to a computer or other electronic device.

Two conventional structural types of pressure transmitters are known: planar designs in which the process diaphragms share the same plane, and bi-planar designs in which the process diaphragms are in different planes and are disposed back-to-back. Conventional planar transmitters generally have an electronics housing that extends horizontally when the transmitter is oriented so that the plane of the process diaphragms is vertical. This configuration can require special hardware to mount the transmitter. Additionally, the electronics housing is displaced from the diaphragm plane in such a way that a read-out meter on the housing is often difficult to see.

Another drawback of conventional planar transmitters is that the electronic circuitry is located close to hot process lines. Specifically, in one prior configuration, the differential pressure transmitter is close to the high pressure and low pressure input process lines. These process lines can radiate heat to the transmitter electronics, thereby creating a hot operating environment. Thus, the transmitter is more susceptible to electrical malfunctions. Additionally, exposing the electronics to unnecessary elevated temperatures reduces the life of the electrical components.

A further drawback of prior transmitters is that the conventional transmitter housing assembly limits the size of the process diaphragms. A large diaphragm diameter is advantageous because it has a correspondingly low spring rate and hence aids high measuring sensitivity. The diaphragm volumetric spring rate is inversely proportional to the sixth power of the diameter of the diaphragm. However, prior pressure transmitter structures restrict the diameter of the process diaphragms to avoid undue size, which leads to a relatively large diaphragm spring rate.

Prior pressure transmitters accordingly resort to thin diaphragms, to achieve a usable spring rate. This, in turn, presents a risk of diaphragm leakage, which is a serious problem.

Conventional planar pressure transmitters endeavor to circumvent the foregoing mounting problems by using a flange adapter, in conjunction with the existing assembly that mounts the pressure transmitter. However, this solution adds weight and cost to the system.

Conventional bi-planar transmitters are relatively heavy and relatively costly. The additional weight stems at least in part from large dual process covers that mount over the process diaphragms, and from the weight of the associated cover mounting hardware.

Another drawback of both the conventional designs is that the electronic circuitry is susceptible to fluid noise, such as mechanical shocks, pipe vibrations and like mechanical disturbances. Consequently, the pressure transmitters are susceptible to producing measurement errors when mechanical disturbances occur.

SUMMARY

The present disclosure provides a robust differential pressure transmitter that is comparatively light in weight and relatively low in cost, has a read-out indicator that is comparatively easy to view, includes a transmitter housing of comparatively small size that mounts process diaphragms of a comparatively large diameter, includes a transmitter housing that is comparatively easy to install and easy to mount, shields electronic components therein from the elevated temperatures of hot process lines and hence maintains the components in a relatively cool environment, and, operates with a reduced loss of performance when measuring fluids subjected to vibration and other mechanical noise.

The disclosed differential pressure transmitter attains the foregoing and other objects with a pressure transmitter having a body portion, first and second normally vertical pressure passageways disposed therein and communicating respectively between first and second opposed pressure openings extending normally horizontally through the body portion, and a transducer mounting element, coupled to the body portion and located above the pressure passageways. A transducer mounts on the transducer mounting element and generates a differential pressure signal. A pair of diaphragm elements is configured to form first and second process diaphragms, closing first and second pressure openings. Flange elements overlie the diaphragm elements and are removably and replaceably secured to the body portion, having liquid drainage and gas purging passageways. The pressure transmitter also can include a flame retardation element that is disposed within at least one of the pressure passageways, and an overrange protection element, integrally arranged with the unitary body portion, that protects the transducer from overrange pressure fluctuations. Extensions on the flange elements afford a variety of mounting options, including mounting to industry standard pipe mountings.

In one embodiment, a pressure transmitter apparatus can include a unitary body having, in a first orientation, (1) vertical surface extending along a first vertical axis and apertured with first and second pressure openings disposed at substantially the same vertical location along a first horizontal axis on opposed faces of the vertical surface, and (2) transducer mounting coupled to the body and located, in the first orientation, vertically above the pressure openings. A diaphragm can form first and second process diaphragms respectively closing the first and second pressure openings. First and second flange can be removably and replaceably secured to the body overlying the diaphragm. The first and second flanges can be apertured to form respective first and second pressure chambers adjacent the diaphragm. The first and second flanges can form respective first and second pressure ports extending vertically within the first and second flanges to intersect with the first and second pressure chambers for coupling first and second pressure inputs to the first and second process diaphragms, respectively. First and second pressure passages can extend vertically at least partly within the body for communicating respectively between the first and second pressure openings and the transducer mounting. Each of the first and second flanges can include a selectively closed first passageway extending horizontally within the first and second flanges to intersect with the first and second pressure chambers, and being offset vertically and horizontally from the first horizontal axis. Each of the first and second flanges can include a selectively closed second passageway extending horizontally within the first and second flanges to intersect with the first and second pressure chambers, and being offset horizontally from the first horizontal axis opposite from the first passageway. The first passageway can be disposed for purging gas and the first and second pressure ports can be disposed for draining liquid when the transmitter apparatus is mounted in the first orientation. The first passageway can be disposed for draining liquid and the first and second pressure ports can be disposed for purging gas when the transmitter apparatus is mounted in a second orientation rotated 180 degrees about the horizontal axis from the first orientation. The first passageway can be disposed for purging gas and the second passageway can be disposed for draining liquid when the transmitter apparatus is mounted in a third orientation rotated ninety degrees about the horizontal axis from the first orientation. The first passageway can be disposed for draining liquid and the second passageway can be disposed for purging gas when the transmitter apparatus is mounted in a fourth orientation rotated one hundred eighty degrees about the horizontal axis from the second orientation. Those of ordinary skill will understand that the use and/or labels of first, second, third, and fourth orientations, as provided herein, is merely for reference purposes relative to a given description/embodiment, and accordingly, in a description of one embodiment, an orientation may be referred to as a "first" orientation, while in a description of another embodiment, such same orientation may be referred to, for example, the "third" orientation.

The pressure transmitter apparatus can include a flame retardant disposed within at least one of the vertically extending first and second pressure passages and located above the pressure openings which extend generally horizontally, and at least partly within the unitary body, for introducing a flame barrier between the transducer mounting and the pressure openings. The unitary body can have a neck interconnecting the transducer element mounting with the vertical surface for providing thermal isolation therebetween.

The transducer mounting can include a sensor and a mounting for the sensor. The sensor can be located, in the first orientation, above the pressure openings and in fluid communication with the first and second passages. A circuit can connect with the sensor and can be selectively operable for electronically designating which of the first and second pressure inputs is a high pressure input. The sensor can include a housing having opposed and substantially parallel first and second faces that are transverse to the first axis and that are axially spaced apart along the first axis, in the first orientation, and a transducer, located at least partly between the first and second faces, for generating a signal in response to the difference in pressure between the first and second pressure inputs applied to the first and second pressure ports. The sensor can also include an overrange protection overlying the second face of the housing and arranged in fluid communication with the first and second pressure passages, for protecting the transducer from an overrange pressure condition, the overrange protection overlying at least the first pressure passage and integrally arranged with the housing of the sensor.

The transducer mounting can include an annular support structure for mounting a sensor assembly and which extends, in the first orientation, along the first vertical axis. The transducer mounting can further include a flat face disposed substantially orthogonal to the first vertical axis in the first orientation, and from which the annular support extends, wherein one of the first and second pressure passages opens onto the face and within the annular support structure and wherein the other of the first and second pressure passages opens onto the flat face external of the annular support structure. A pressure sensor assembly can couple to the transducer mounting, disposed in fluid communication with at least one of the first and second pressure passages, and having overrange protection for protecting against an overrange pressure condition coupled to at least one of the pressure passages, the pressure sensor assembly being adapted for mounting within the annular support structure such that the overrange protection overlies the pressure passage opening onto the flat face within the annular support structure.

The transducer mounting can include a horizontal annular surface coupled to the unitary body and located, in the first orientation, vertically above the pressure openings. The horizontal annular surface can include a transducer element seating, and a connection mounting an electronics housing to the horizontal surface. The connection can include a stepped annular surface for seating the electronics housing. The seating can include an annular transducer mount integrally formed on the horizontal annular surface and extending outwardly from the seating.

A pressure sensor assembly can couple to the transducer mounting, disposed in fluid communication with at least one of the first and second pressure passages, and having an overrange protection for protecting against an overrange pressure condition coupled to at least one of the pressure passages. The pressure sensor assembly can include a housing having opposed and substantially parallel first and second faces that are transverse to the first axis and that are axially spaced apart along the first axis, in the first orientation, and a pressure sensing element, located at least partly between the first and second faces, for generating a signal in response to the difference in pressure between the first and second pressure inputs applied to the first and second pressure ports. The overrange protection can overlie the second face of the housing and is arranged in fluid communication with the first and second pressure passages, for protecting the pressure sensing element from an overrange pressure condition.

The pressure transmitter can include an overrange-protected sensor for producing an electrical signal responsive to first and second pressure conditions applied thereto. The sensor can seat with the mounting in fluid communication with at least one of the pressure passages. First and second fastener apertures can each extend horizontally, when in the first orientation, through the body and the first and second flanges. The apertures can be horizontally spaced apart and disposed below the transducer mounting and below the sensor. First and second threaded fasteners can each pass within the same-numbered fastener aperture for securing the body and the first and second flanges when assembled together.

The pressure transmitter apparatus can include apertures in both the body and the first and second flanges for mounting a plurality of fasteners, with the apertures in the first and second flanges being disposed in registration with the apertures in the body when mounted together to facilitate seating of the fasteners. The fastener shrouding on the body and the first and second flanges can shroudingly enclose the fasteners in the aperture thereof throughout engagement with the first and second flanges and with the body. A seal engaged between the diaphragm and the first and second flanges can seal each pressure port with respect to one process diaphragm, and first and second weld connections can each sealingly secure the same-numbered process diaphragm to the body at the same-numbered pressure opening, each weld connection being isolated from contact with fluids at the pressure inputs by the seal. First and second flame arrestors, vertically disposed respectively in the first and second pressure passages, can introduce flame barriers between the transducer mounting and the pressure openings.

The opposed faces of the vertical surface can include a pair of parallel surface elements spaced apart in a direction orthogonal to the first axis, and the first and second pressure openings can be oppositely arranged and substantially parallel to each other and the pressure passages are formed within the body between the surface elements. The first and second flanges can include a cover forming first and second process covers overlying the first and second process diaphragms, respectively, with each process cover being apertured with at least one fastener-receiving opening. The diaphragm can include a pair of diaphragm sheets forming first and second process isolation diaphragms respectively closing the first and second pressure openings formed, and a pair of weld plates, each having an aperture dimensioned and sized to define the first and second process diaphragms. Each weld plate can be configured to overlie each diaphragm sheet and configured for mounting between the vertical surface and one of the first and second flanges when the pressure transmitter is assembled.

The pressure transmitter apparatus can include plural bolt-type fastener for removably and replaceably securing the first and second flanges to the body. A first shroud formed on the body can shroudingly enclose at least a selected length of each the bolt-type fastener, and second shroud formed on each of the first and second flanges can shroudingly enclose at least a selected length of each bolt-type fastener. The first and second shroud, in combination, can shroud nearly the entire length of the fastener. The fastener for removably and replaceably securing the first and second flanges to the body can include two threaded fasteners, each extending through the first and second flanges and the body. The pressure transmitter apparatus can include overrange-protected sensor for producing an electrical signal responsive to first and second pressure conditions applied thereto, the sensor being seated with the mounting in fluid communication with at least one of the pressure passages.

The pressure transmitter apparatus can include an upwardly extending neck portion of relatively low thermal conductivity. The transducer mounting can be integrally formed with the neck portion to be relatively thermally isolated from and located above the pressure openings. The first and second diaphragms can respectively seal the pressure openings on the vertical surface, and a differential pressure sensor can be secured on the transducer mounting and disposed, in the first orientation, above the pressure openings. The first and second passages can communicate respectively between the first and second pressure openings and the differential pressure sensor, for separately communicating to the sensor first and second pressures responsive to pressures applied to the first and second pressure ports.

The first and second flanges can be interchangeable. A flange mounting can extend from each of the first and second flanges for mounting the pressure transmitter apparatus to at least one mounting bracket. The flange mounting can include two threaded bores to receive mounting bolts of the at least one mounting bracket. The bores can extend horizontally and perpendicularly to the first horizontal axis into opposite faces of each of the first and second flanges. The first and second flanges can include process connections connecting the first and second pressure inputs to the first and second flanges. The first passageway can include a flared termination at the respective first and second pressure chambers. The flared termination can extend radially about the first horizontal axis such that the flared termination in the first orientation extends vertically from the first horizontal axis opposite the respective first and second pressure ports, and extends horizontally from the first horizontal axis opposite the second passageway.

In one embodiment, a pressure transmitter apparatus can include unitary body having, in a first orientation, first and second pressure openings disposed at substantially the same vertical location along a first horizontal axis on opposed vertical faces of the body; transducer mounting coupled to the body and located, in the first orientation, vertically above the pressure openings; first and second pressure passages vertically extending at least partly within the body for communicating respectively between the first and second pressure openings and the transducer mounting; diaphragm forming first and second process diaphragms respectively closing the first and second pressure openings; first and second flanges removably and replaceably secured, respectively, to the opposed vertical faces of the body, and overlying the diaphragm, the first and second flanges apertured to form respective first and second pressure chambers adjacent the diaphragm, the first and second flanges forming respective first and second pressure ports extending vertically within the first and second flanges to intersect with the first and second pressure chambers for coupling first and second pressure inputs to the first and second process diaphragms, respectively, wherein, in the first orientation, each of the first and second flanges includes a selectively closed first passageway extending horizontally within the first and second flanges to intersect with the first and second pressure chambers, respectively, and being offset vertically and horizontally from the first horizontal axis, the first passageway having a flared termination at the respective first and second pressure chambers, the flared termination extending radially about the first horizontal axis such that the flared termination in the first orientation extends vertically from the first horizontal axis opposite the respective first and second pressure ports, and extends horizontally from the first horizontal axis opposite the second passageway, wherein, in the first orientation, each of the first and second flanges includes a selectively closed second passageway extending horizontally within the first and second flanges to intersect with the first and second pressure chambers, respectively, and being offset horizontally from the first horizontal axis opposite from the first passageway, the first and second passageways in combination with the first and second pressure ports disposed for purging gas and draining liquid when in one of the first orientation and a second orientation, rotated 180 degrees about the first horizontal axis from the first orientation, the first and second passageways alternately disposed for purging gas and draining liquid when the transmitter apparatus is mounted in one of a third orientation rotated 90 degrees about the first horizontal axis from the first orientation and a fourth orientation rotated 180 degrees about the first horizontal axis from the third orientation.

The pressure transmitter apparatus can include at least first and second fastener apertures, each extending horizontally, when in the first orientation, through the body and the first and second flanges, the apertures being horizontally spaced apart and disposed below the transducer mounting; at least first and second threaded fasteners, each passing within the respective fastener aperture for securing the body and the first and second flanges when assembled together; and fastener shrouding on the body and the first and second flanges and shroudingly enclosing the fasteners in the aperture thereof throughout engagement with the first and second flanges and with the body. A flame retardant and/or means for providing the same can be disposed within at least one of the vertically extending first and second pressure passages and located above the pressure openings which extend generally horizontally, and at least partly within the unitary body, for introducing a flame barrier between the transducer mounting and the pressure openings.

A pressure sensor assembly can couple to the transducer mounting and be disposed in fluid communication with at least one of the first and second pressure passages. The pressure sensor assembly can include an overrange protection for protecting against an overrange pressure condition coupled to at least one of the pressure passages. The first and second flanges can include at least first and second threaded bores extending horizontally and perpendicularly to the first horizontal axis into opposed faces of each of the first and second flanges. The threaded bores can receive mounting bolts of at least one mounting bracket for mounting the pressure transmitter apparatus to the at least one mounting bracket. The first and second flanges can also include a process connection connecting the first and second pressure inputs to the first and second flanges.

These and other aspects of the disclosed differential pressure transmitter are evident in the drawings and in the description which follows.

BRIEF DESCRIPTION OF THE DRAWINGS

The foregoing and other objects, features and advantages of the disclosed differential pressure transmitter will be apparent from the following description and apparent from the accompanying drawings, in which like reference characters refer to the same parts throughout the different views. The drawings illustrate principles of the disclosed differential pressure transmitter and, although not to scale, show relative dimensions.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

The pressure transmitter of a first embodiment of the disclosed differential pressure transmitter determines the pressure difference between two input process lines. The transmitter includes a sensor body having flange portions and a web portion and a pair of opposed planar openings each closed by an isolation diaphragm. The diaphragms are in pressure communication with a sensor element by way of an inert fill fluid. The pressure inputs apply a pressure to the diaphragms, which is transmitted to a sensor element by the fill fluid. The sensor element generates a signal, in response to the applied pressures, indicative of the pressure difference between the two pressure inputs. The sensor body employs a horizontal bolt-hole configuration that accommodates correspondingly large diaphragms. The larger diaphragms have a correspondingly lower spring rate, and thus have a higher measuring sensitivity.

The pressure transmitter also mounts a sensor assembly uppermost on the sensor body that includes an integrally mounted overrange diaphragm. The overrange diaphragm protects the sensor element mounted within the sensor assembly from overrange pressure conditions. The sensor body also presents high thermal resistance between the input process lines and the sensor assembly, shielding the sensor and associated electronics from undesirable elevated temperatures.

The bolt-holes of the transmitter further mount fasteners that are enclosed or shrouded along the fastener length by the sensor body. The shrouded bolts help prevent the leakage of process fluid applied to the pressure ports by maintaining the temperature along the length of the bolt at or near the temperature of the sensor body.

Figure 1:
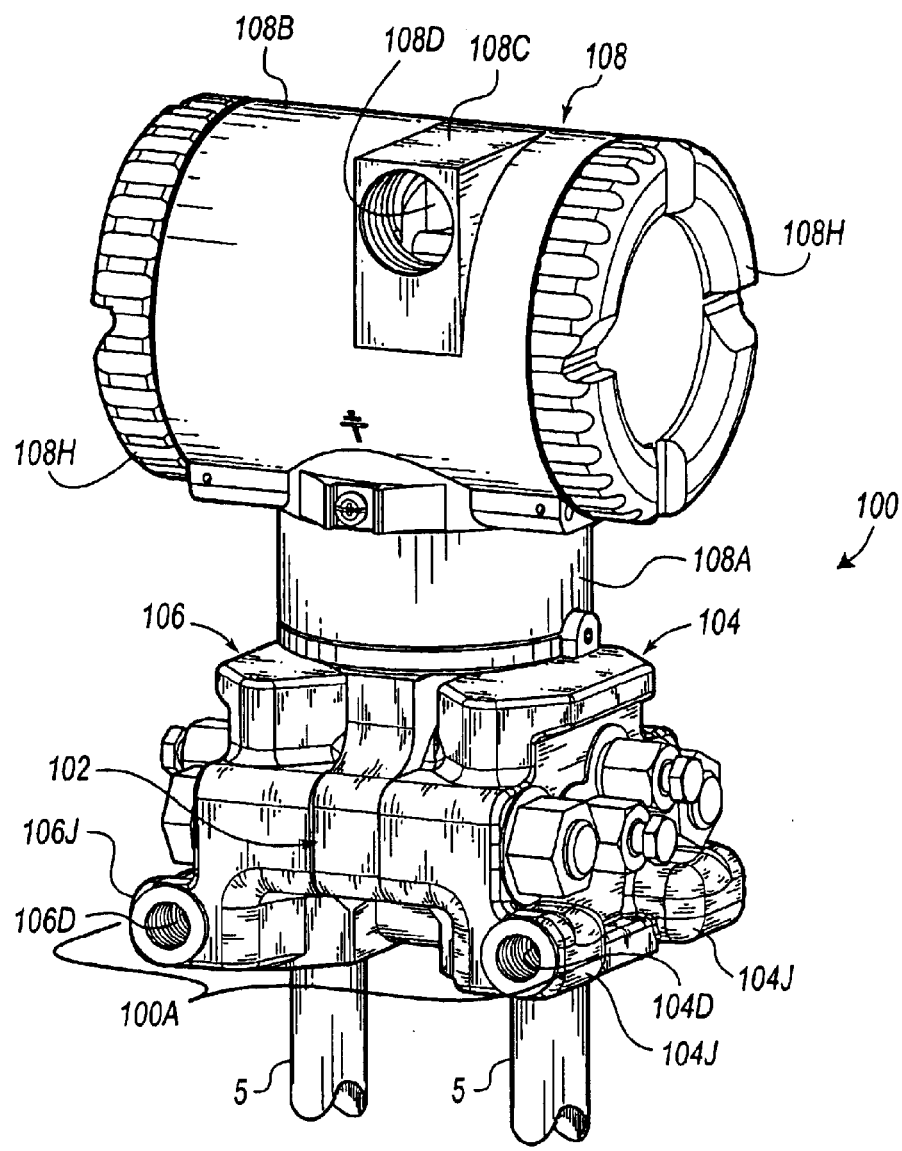
FIG. 1 is a perspective view of a bi-planar pressure transmitter.
Figure 2:
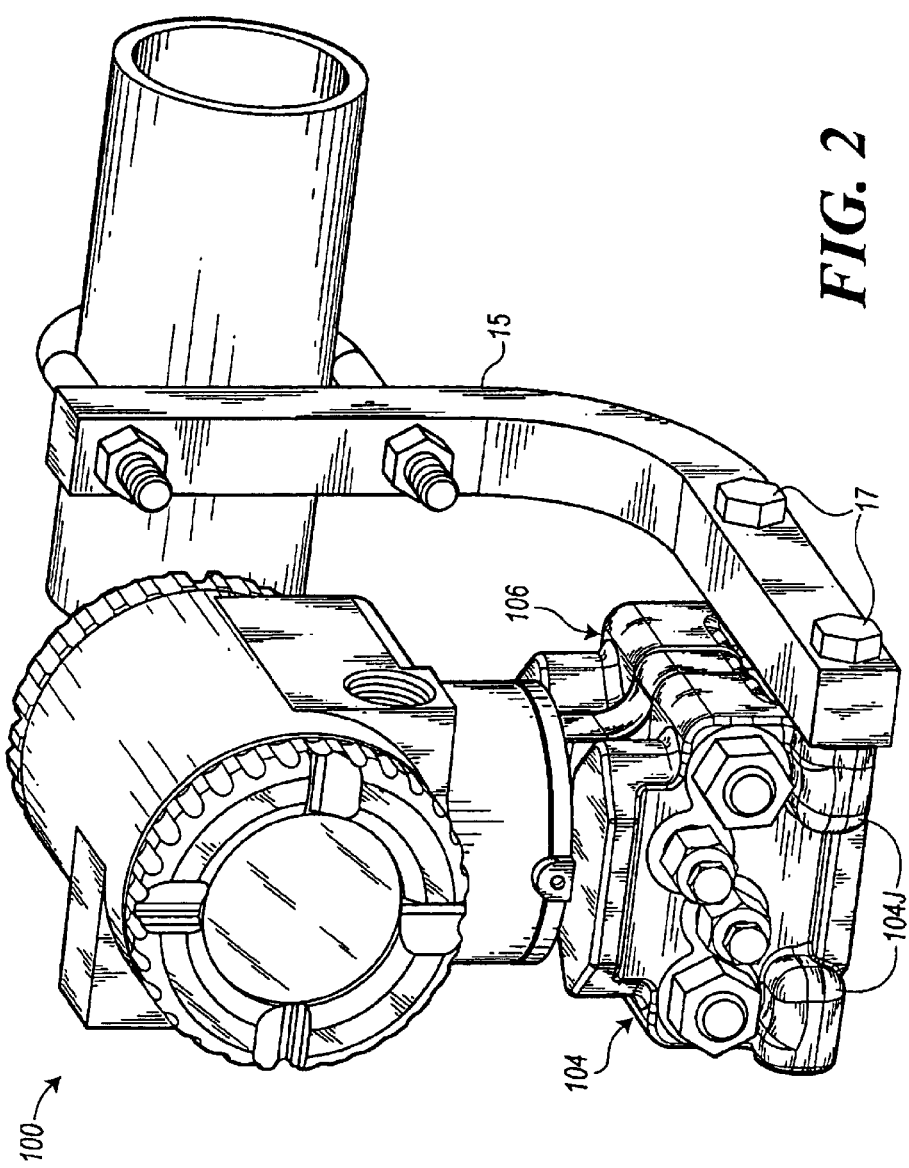
FIG. 2 is a perspective view of the pressure transmitter of FIG. 1 according to one embodiment of the disclosed differential pressure transmitter with associated mounting hardware.

FIGS. 1–3 show a bi-planar differential pressure transmitter 100 that measures the difference in pressure between two pressure inputs, i.e. between two different fluid pressures, coupled to two input process connections, e.g., process lines 5, 5. The pressure transmitter 100 has a unitary body element 102 that assembles with flanges 104, 106 to either side of body 102. Flanges 104, 106 respectively receive the two input process connections, 5, 5. In this arrangement, the unitary body element 102 conveys pressures, which are responsive to pressure inputs from the input connections 5, 5, to a transducer mounted with the body element 102, and further described with respect to a sensing assembly in FIG. 4. In response, the transducer produces a signal indicative of the difference in pressure between the two inputs. Electronic circuitry within an electronic housing 108 processes the transducer signal, and typically includes an output display (not shown). The housing 108 mounts on the body element 102.

In FIG. 2, transmitter 100 is illustrated rotated 90° about a vertical axis from the orientation of FIG. 1. Transmitter 100 can be mounted to a mounting bracket 15 by bolts 17 that can thread into blind bolt holes 104D, 106D, of flanges 104, 106. Flanges 104, 106 can each include a pair of knobbed extensions, 104J, 106J to accommodate bolt holes 104D, 106D on opposite faces of flanges 104, 106.

Figure 3A:
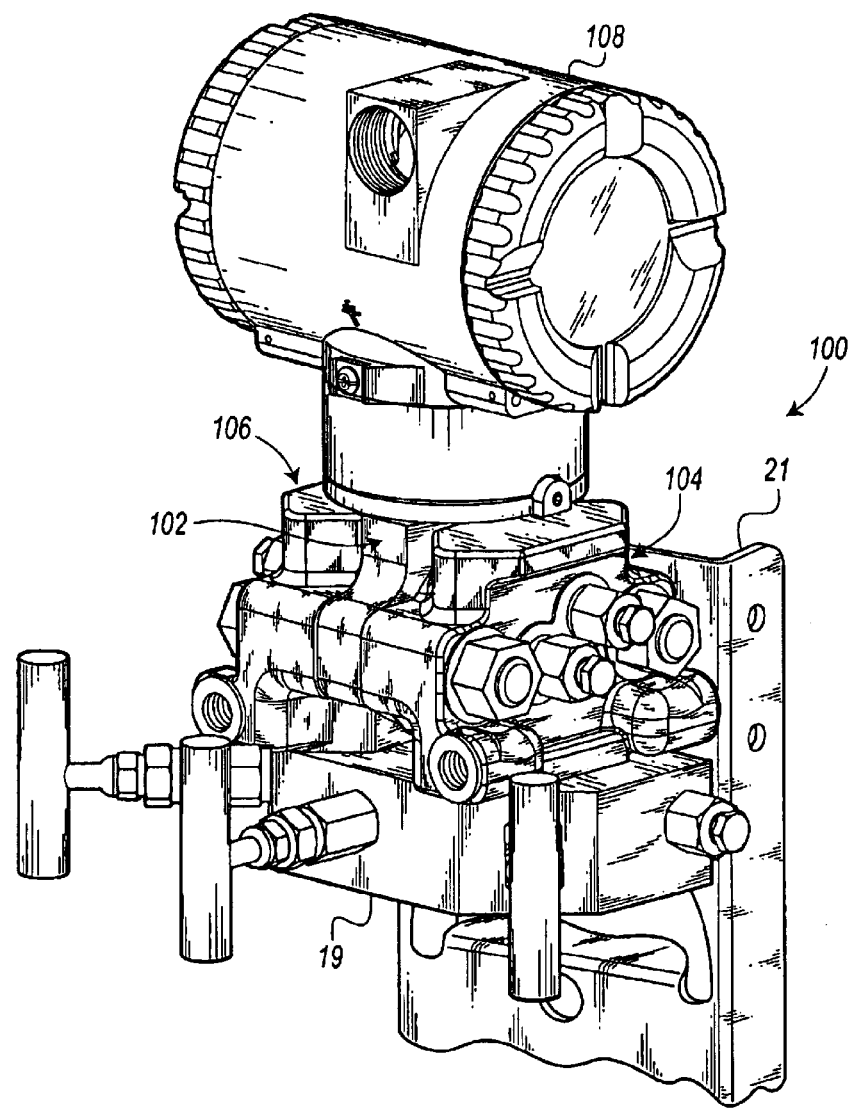
FIG. 3A is a perspective view of the pressure transmitter of FIG. 1 with an associated manifold and mounting hardware.
Figure 3B:
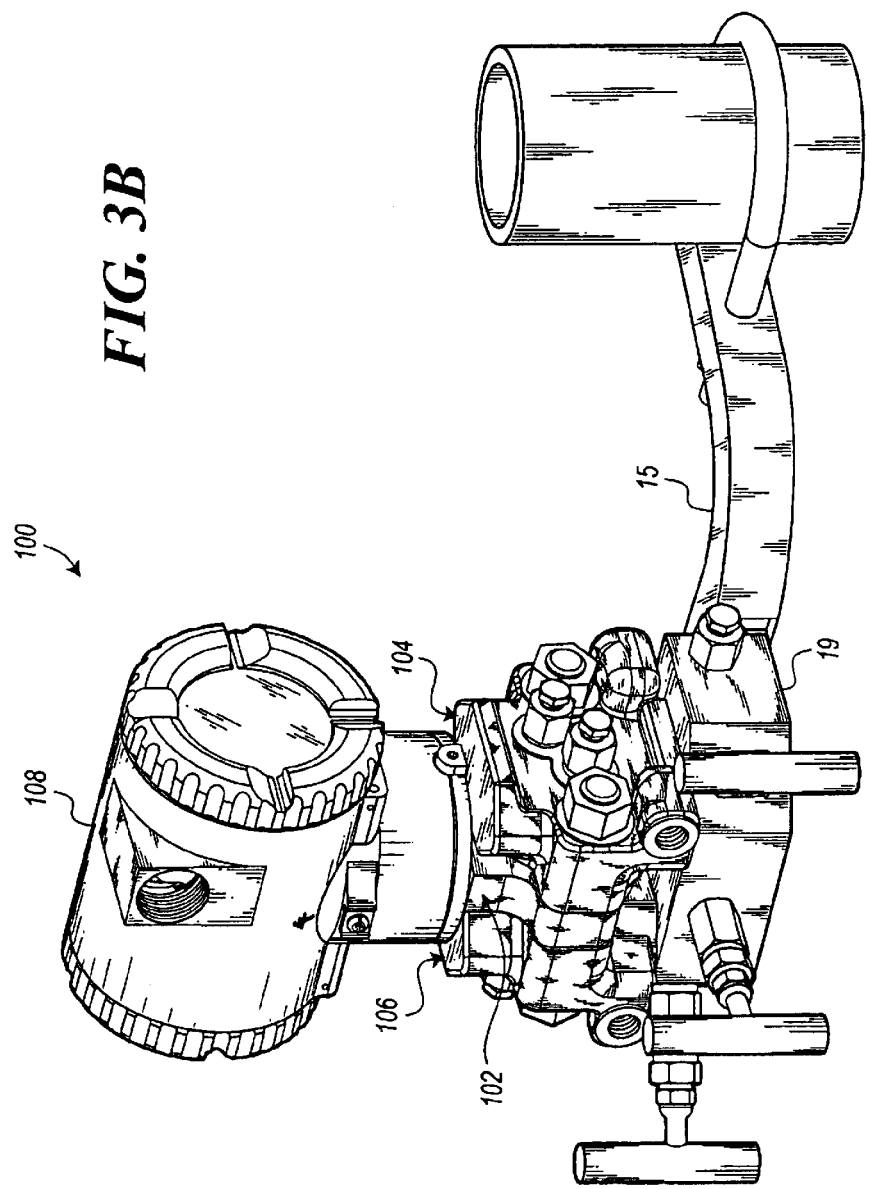
FIG. 3B is a perspective view of the pressure transmitter of FIG. 2 with an associated manifold.
Figure 10:
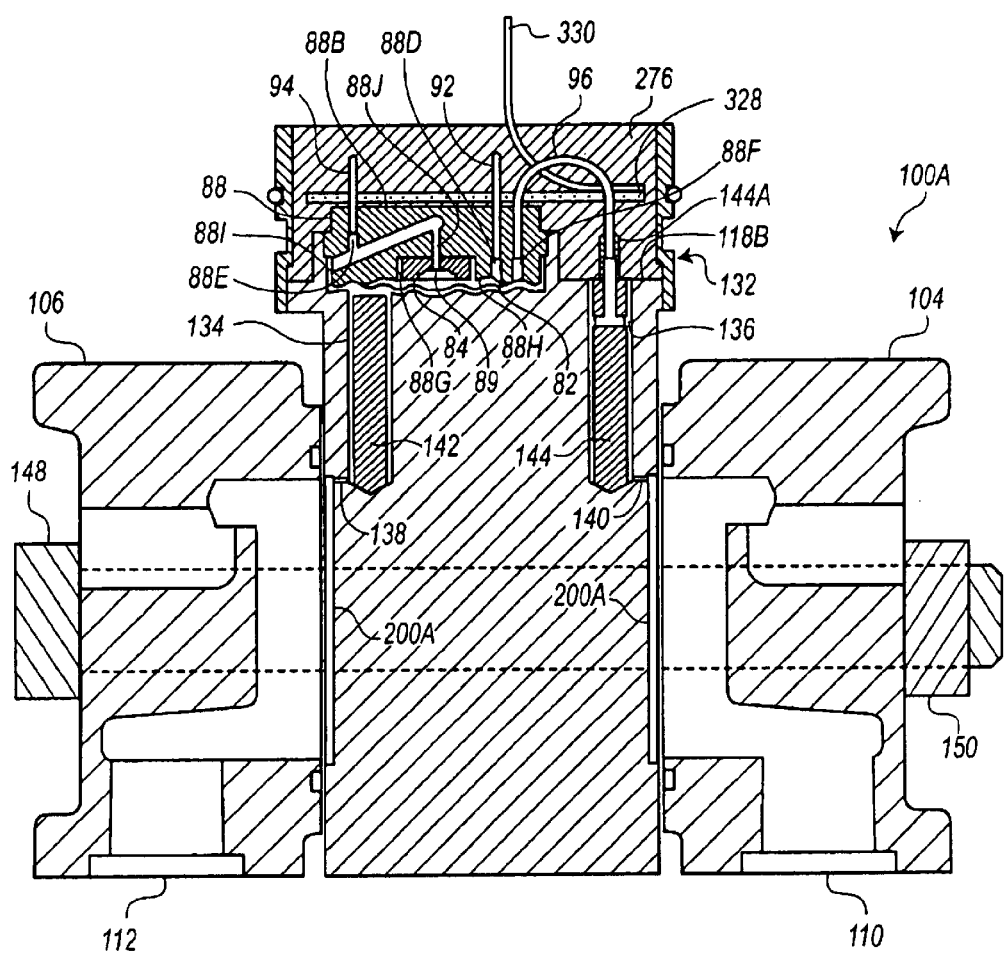
FIG. 10 is a diagrammatic elevation view, in section, of the pressure transmitter of FIG. 4, as assembled and with elements diagrammatically relocated.

Referring back to FIG. 1, the assembled flanges 104, 106 and body element 102 of the transmitter 100 form a sensor assembly 100A that, as shown in FIG. 10, has first and second pressure ports 110, 112 extending up into the flanges 104, 106 into chambers 104A, 106A of flanges 104, 106, respectively. The housing is usually installed in the upright orientation shown, where the pressure ports are at the bottom of the transmitter, conforming to standard industry mountings for such transmitters. In addition to the mounting bracket 15 shown in FIG. 2, transmitter 100 can mount on a manifold, such as manifold 19, as indicated in FIGS. 3A and 3B. Manifold 19 can be one of a number of manifolds known and standard in the industry for providing process connections. The pressure ports, 110, 112 can connect to the process connections of the manifold 19 (not shown in FIGS. 3A and 3B). Thus, it can be seen that transmitter 100, with its upright orientation and with pressure ports 110, 112 at the bottom of the transmitter, together with the horizontally spaced bolt holes 104D, 106D, can provide a generally universal replacement for standard industry transmitters. It can be understood that other bracket configurations, such as bracket 21 in FIG. 3A, and bracket 15 in FIG. 3B, and other orientations of transmitter 100 can be used, as described in more detail below.

Figure 4:
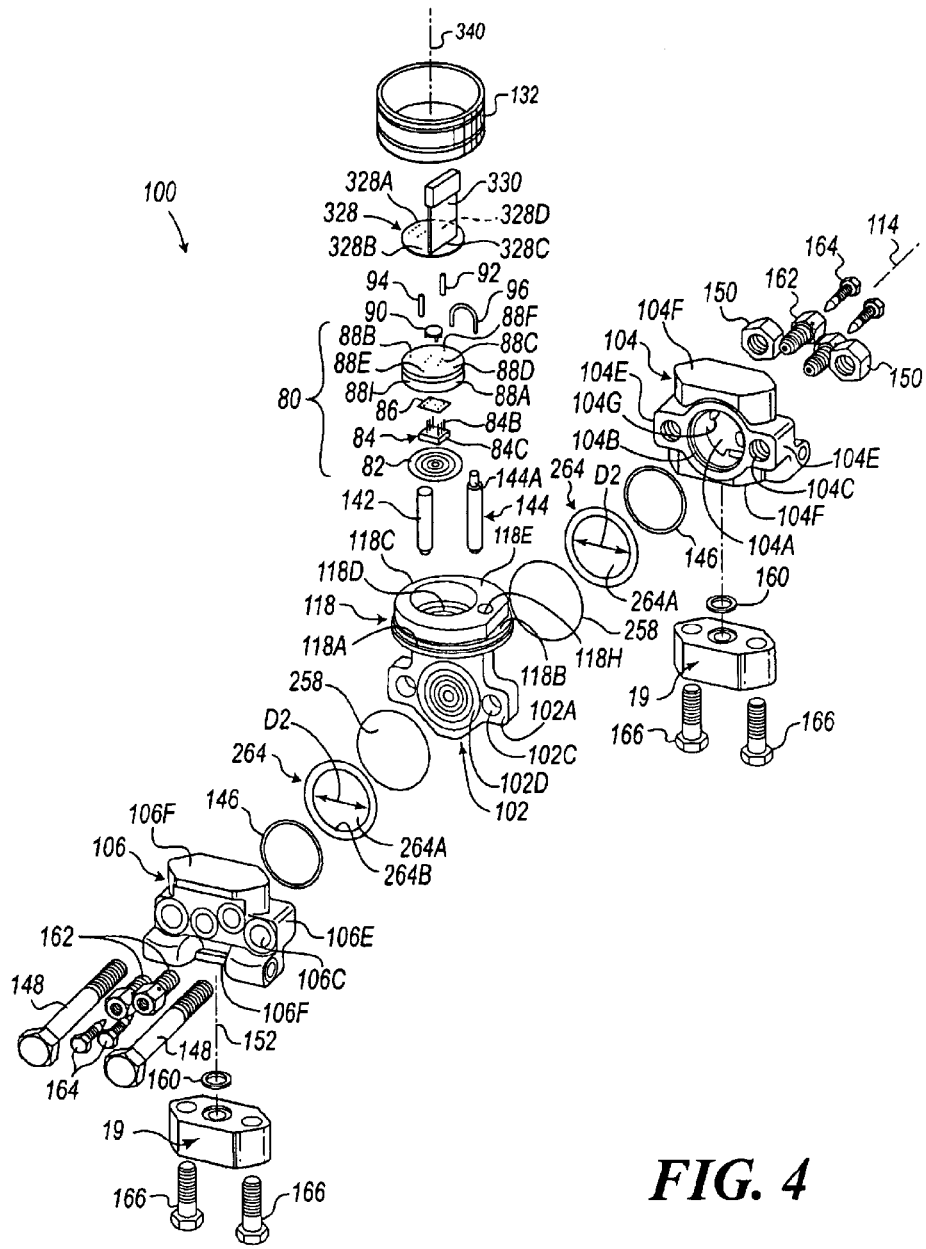
FIG. 4 is an exploded partial view of an embodiment of a bi-planar pressure transmitter.
Figure 5:
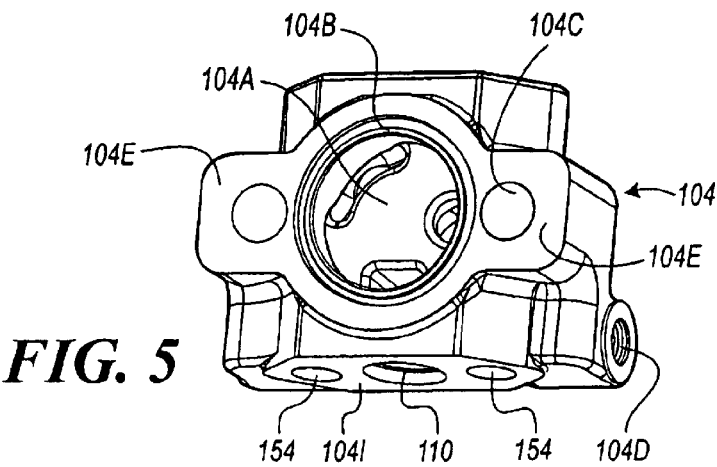
FIG. 5 is a perspective view of a flange element of the pressure transmitter of FIG. 4.

Referring now to FIGS. 4–9, various views of the elements of the bi-planar transmitter of FIG. 1 are shown. FIG. 4 shows, in disassembled and exploded form, an embodiment of a bi-planar pressure transmitter 100 (with housing 108 removed) embodying further features of the disclosed differential pressure transmitter. The pressure transmitter 100, which receives two pressure input lines from beneath the transmitter 100 as described above, has opposed pressure diaphragms. The pressure transmitter 100 includes a body element, or web 102 that is clamped between elbow-type flanges 104 and 106. The web can be symmetrically centered in the transmitter 100, along a first normally horizontal axis 114, and has a rounded periphery to reduce the number of sharp contours. Flanges 104, 106 form input pressure ports 110 and 112, respectively, to which process connections typically are attached, such as may be illustrated by connections 5 in FIG. 1, or by manifold 19 connections in FIG. 4. The transmitter 100 is illustrated as having a transducer mounting portion 118 that seats a sensing assembly 80, similar respectively to a mounting portion and a sensor assembly of the bi-planar transmitter described in U.S. Pat. Ser. No. 6,038,927 ("the '927 patent") incorporated herein by reference in its entirety.

Figure 8:
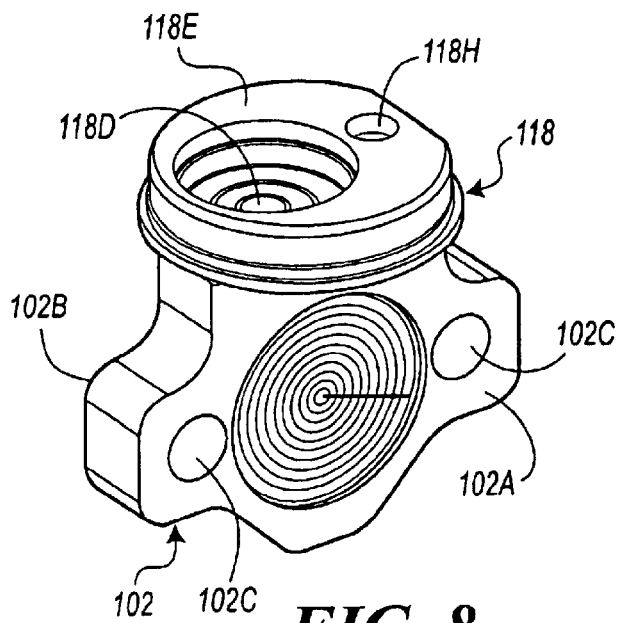
FIG. 8 is a perspective view of a body element of the pressure transmitter of FIG. 4.
Figure 9:
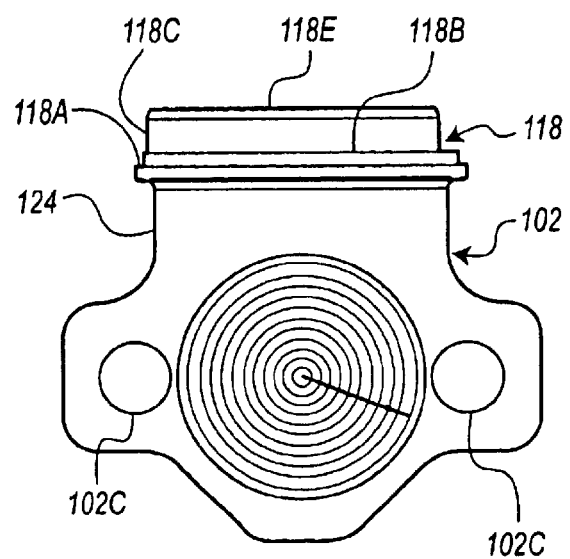
FIG. 9 is an elevation view of the body element of FIG. 8.

More particularly, the illustrated web 102, FIGS. 4, 8 and 9, has opposed and parallel first and second normally vertical surfaces 102A and 102B. Horizontally spaced bolt holes 102C aperture the web 102 and extend, parallel to the axis 114 and transverse to a first, normally vertical axis 340, between the two surfaces 102A and 102B. The normally vertical surfaces 102A and 102B are recessed, and can be identical, with a set of concentric convolutions 102D. Each illustrated set of convolutions forms a sinusoidal profile.

The web 102 has an integrally formed extending neck portion 124 extending vertically along axis 340 and that mountingly connects to the transducer mounting portion 118. The neck portion sensor can present high thermal resistance between the input process lines and the sensing assembly 80, shielding the sensor assembly 80 and associated electronics from undesirable elevated temperatures. The illustrated transducer mounting portion 118 is similar to the transducer mounting portion of the bi-planar transmitter embodiment of the '927 patent, and has a first annular surface 118A and a second stepped concentric surface 118B. A vertically extending tubular mount 118C is integral with the second surface 118B, and extends axially along axis 340 therefrom to an uppermost surface 118E (in the orientation of FIG. 4). The mount 118C can circumscribe a first pressure passageway 134 (FIG. 10) and surface 118E overlies the second pressure passageway 136 (FIG. 10) and is apertured with a bore 118H that aligns with that passageway. The surfaces 118A and 118B are concentric with the axis 340, and the mount 118C is radially offset from the axis 340. Within tubular mount 118C, the second surface 118B forms a mounting surface 118D that has an undulating contour, which can be formed by concentric convolutions.

An instrument casing 108 (FIG. 1) mounts on the transmitter mounting portion 118 by seating on a collar 132 that seats on the web in the annular lip formed by the first surface 118A, and the periphery of the stepped second surface 118B. In an embodiment, the collar 132 is welded to the transducer mounting portion 118 of the web 102 along this lip.

As also shown in FIG. 10, first and second pressure passageways 134 and 136 open onto the second surface 118B of the mounting portion 118, and extend vertically within the web 102. The first and second pressure passageways 134, 136 communicate with transverse, i.e. horizontally-extending, first and second pressure openings 138 and 140, respectively, formed in the web 102. The pressure passageways 134 and 136 and the openings 138 and 140 communicate the pressures applied to the diaphragms 200A and 200B mounted at the opposed web faces 102A and 102B, at the recesses, to the transducer mounting portion 118. Flame arrestors 142 and 144, similar to the flame arrestors of FIG. 4, seat in the first and second pressure passageways 134 and 136, respectively. Those of ordinary skill will recognize that two flame arrestors may not always be needed, particularly when all potential flame sources are on one side only of the sensing assembly 80.

Pressures applied to the input ports 110 and 112 of the flanges 104, 106 are coupled to the diaphragms and thus the convoluted recesses of the web 102 with further structure, as now described with reference to FIGS. 4–7. Each illustrated flange 104 and 106 can be a one-piece machined metal casting and forms one input pressure port 110 and 112, respectively. A rear face (in the orientation of FIG. 4) of the flange 106 is recessed with a chamber 106A, illustratively of substantial circular cross-section that overlies the recessed convolutions 102D of the web surface 102A. Likewise, a face of the flange 104 (forward facing in FIG. 4) is recessed with a chamber 104A that overlies the recessed convolutions (not shown) of the web surface 102B. Gasket grooves, for example groove 104B of flange 104, are concentric with the chambers 104A and 106A, respectively, and seat deformable gaskets 146. Bolt holes 104C and 106C extend through the flanges 104 and 106, in alignment with the bolt-holes 102C in the web 102, and receive bolts 148, 148. The illustrated transmitter 100 is assembled with two bolts 148, 148 that extend through the two flanges and through the web 102 and are secured by nuts 150, 150.

Each illustrated flange 104 and 106 has two oppositely-disposed bolt shrouds 104E, 104E, and 106E, 106E, configured as shown, each of which encloses and thereby shrouds the portion of a bolt 148 that extends beyond the web 102. Further, the web 102 encloses and thereby shrouds the length of each bolt 148, which extends between the flanges. The assembly of this bolt shrouding structure of the web 102 and of the two flanges 104 and 106 forms a continuous enclosure over each bolt 148 along the passage thereof between the three assembled parts 102, 104 and 106. The resultant full shrouding of each bolt 148, 148 enhances the operational safety of the pressure transmitter 100, including a reduction of the potential to leak process fluids applied to the pressure ports 110 and 112, caused by unequal thermal expansion of the bolts and assembly.

Each illustrated pressure port 110 and 112 extends parallel with a second normally-vertical axis 152 that is perpendicular to the axis 114 and parallel to the axis 340. Each illustrated pressure port 110 and 112 opens at a bottom peripheral surface of each flange 104, 106, respectively, illustrated in FIG. 4 as the surface that faces downward and illustrated in elevation in FIG. 7.

Figure 6:
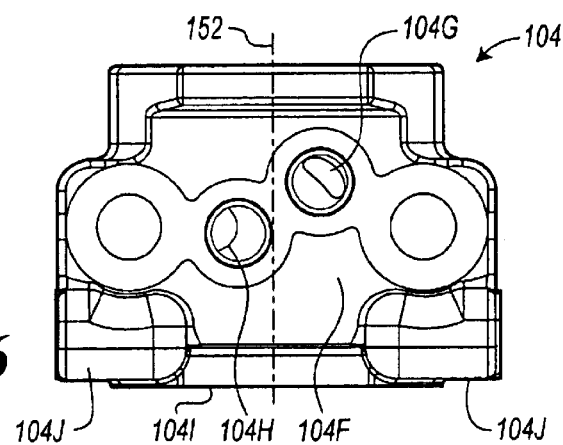
FIGS. 6 and 7 are elevation views of opposite faces of the flange element of FIG. 5.

With further reference to FIGS. 9 and 10, each illustrated flange 104, 106 has a peripheral face 104F and 106F, illustrated in elevation in FIG. 6. Two threaded passages 104G, 104H extend from peripheral face 104F to the chamber 104A. The two passages 104G, 104H of the flange 104 extend along axes parallel to axis 114 and perpendicular to axis 152. For the orientation shown in FIGS. 4 and 7, passage 104G intersects the chamber 104A at the periphery of chamber 104A at a point above and to the left of axis 114 and generally at an angle of 45° from axis 114 with respect to a horizontal diametric plane of chamber 104A. Passage 104H intersects the periphery of chamber 104a at the rightmost point of the horizontal diametric plane.

Figure 7:
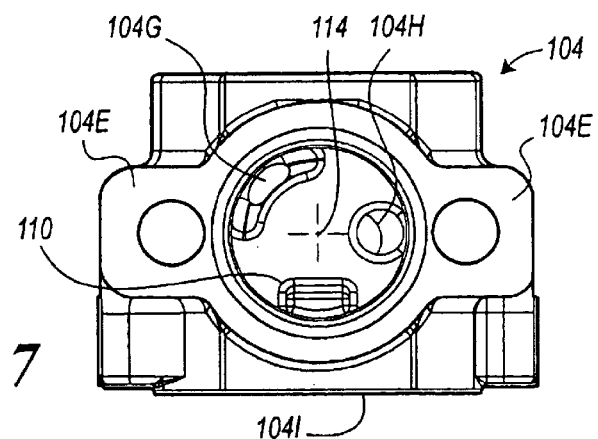

In the orientation of the flange 104 shown in FIGS. 4 and 7, the passage 104G enters the chamber 104A above the middle of the chamber 104A, e.g., above the horizontal diameter. Accordingly, the passage 104G can operate to purge gas that can collect in chamber 104A. Passage 104G can be flared along the periphery upon entering chamber 104A, such that gas can be purged from near a high point of the chamber 104A. In this position, transmitter 100 can be self draining, with pressure port 110 serving to drain liquid including condensate from chamber 104A. It can be seen that if the transmitter 100 is rotated counterclockwise 90°, such that pressure port 110 is horizontal and to the right, passage 104H enters at the uppermost point of the periphery and can operate to purge gas from chamber 104A. In the rotated orientation, passage 104G is below a horizontal diameter, and the flaring of passage 104G provides for draining liquid from near the lower point of chamber 104A. A further counterclockwise rotation of 90°, can bring pressure port 110 to the top of chamber 104A, such that transmitter 100 can be self purging. As previously, passage 104G is below a horizontal diameter, and the flaring of passage 104G provides for draining liquid from near the lower point of chamber 104A. A still further counterclockwise rotation of 90° brings pressure port 110 horizontal and to the left. The passage 104G is above a horizontal diameter and the passage 104H is at the lower point of chamber 104A, such that passage 104G can purge chamber 104A of gases and passage 104H can drain chamber 104A of liquids. It can be seen that flange 106 can be identical to flange 104, and having an orientation rotated 90° about axis 152 from that of flange 104. Thus, the flange 106 passages 106G, 106H, formed therein identical to passages 104G, 104H, respectively, of flange 104, can operate to assist in purging and draining operations for chamber 106A.

Operation for self-draining with process gases is shown in FIG. 10. Liquids settle in chamber 104A, 106A and return to the process gas in pipe 5 through pressure port 110, 112. Similarly, when inverted, the flange 104, 106 provides self-venting operation for liquids, and gases in chamber 104A, 106A and in connecting passages returns to the process stream in pipe 5. As described above, horizontal orientations of the transmitter 100 also provide either self-draining or self-venting operation. In such cases, the appropriate passageway 104G, 104H, 106G, 106H can have a connection to the process pipe 5.

Each pressure port 110, 112 includes a recess for seating a mating protrusion in a process connection, such as in manifold 19 and for seating a circular seal 160. An optional filter screen can be mounted within each flange 104, 106 to remove particulate matter present in the input process medium. When the flange passage 104G, 104H, 106G, 106H or the port 110, 112 operates as a purge for gases, as illustrated in FIG. 10, a vent body 162 can be threaded therein. The vent body has a ventilation throughbore. A ventilation needle 164 removably and replaceably seats in the bore for selectively closing it and, alternatively, opening it to purge fluids. The vent body allows an operator to break vacuum and allow the chamber to drain. Either a vent body or a vent plug can be used in passages 104G, 104H, 106G, 106H or ports 110, 112 depending on operator needs or transmitter orientation.

The further structure of the flange faces 1041, 1061 (shown in perspective in FIG. 5 and in edge view in FIGS. 6 and 7) includes recessing each with threaded bolt holes 154 that receive bolts 166 for mounting process connectors at the pressure port 110, such as may be provided with manifold 19. Threaded bolt holes 154 extend into each flange parallel with the axis 152. As indicated in FIGS. 3A and 3B, the manifold 19 overlies the pressure ports 110, 112 and can have through bolt-holes at locations complementary to threaded bolt holes 154 and can have input passageways at locations complementary to the passages formed by pressure ports 110, 112. It can be understood that other process connectors, including those described in the '927 patent, can be used.

Thus, the illustrated flange 104 can be used in the upright orientation of transmitter 100 shown in FIG. 4 or in the inverted or horizontal orientations, as described above, so as to accommodate mounting restrictions that can be encountered. The flange 106 can be identical to and hence interchangeable with the flange 104. The flange 106 hence has face 106F and passages 106G, 106H for venting and for input porting. A process connector can be mounted by bolting at the input port 112, and a vent body 162, removably and replaceably seating a vent needle 164, can be threaded into the passages 106G, 106H, or port 112, as previously described.

As also shown in the exploded view of FIG. 4, the pressure transmitter 100 employs two circular diaphragm plates 258, 258, that overlie the web faces 102A, 102B, thus covering the corrugated regions, e.g. region 102D, formed on both faces. The diaphragm plates can form first and second bi-planar process diaphragms 200A and 200B, FIG. 10. Weld plates 264, 264, overlie the exposed faces of the diaphragm plates 258. Each weld plate has a circular opening 264A having a diameter D2 equal to or slightly smaller than the outer diameter of the convoluted regions 102D, 102E (the convoluted region 102E being on face 102B). Each weld plate 264 hermetically seals the diaphragm plate 258 to the web 102, as by forming a laser or other penetrating weld 264B to the web 102 at the periphery of the plate 264 and at the circumference of the opening 264A. The deformable gaskets 146, 146 mount over the welds 264B formed around the openings 264A. The diameter of each gasket can be smaller than the diameter of the weld line at the circumference of each opening 264A, to ensure that process fluid does not wet the weld connection.

The diameter of the circular chambers 104A, 106A can be equal to or slightly less than the diameter D2 of the weld plate openings 264A. In an embodiment, each chamber 104A, 106A allows the input process medium applied by one pressure input line to act upon the entire portion of the diaphragm plate overlying one convoluted region 102D, 102E, i.e. the portion that is circumscribed by the chambers 104A, 106A.

Thus, in the assembled transmitter 100 (FIGS. 1–3 and 10), the illustrated axial succession of weld plates 264, 264, the diaphragm plates 258, 258, and the gaskets 146, 146 is secured between the web 102 and the two flanges 104, 106. In one embodiment, diaphragm plates 258, 258, and/or weld plates 264, 264, can be configured complementary to the surfaces 102A and 102B of the web 102, having punched holes at locations complementary to the bolt-holes 102C.

Referring again to FIG. 4, a sensing assembly 80, identical in structure and operational features to the sensor assembly of the '927 patent, mounts in the annular mount 118C. The sensing assembly 80 includes an overrange diaphragm 82, a chip carrier 84, an epoxy mounting sheet 86, and a header 88. The illustrated header 88 has a substantially circular main body 88A having a flat top face 88B from which a series of transducer lead-out holes 88C and fill tube holes 88D, 88E, and 88F extend into the body 88A. Referring to FIG. 10, a substantially rectangular cavity 88G recesses an opposed bottom face 88H of the header 88. The illustrated header 88 has a first opening 88D and a third opening 88F, both of which extend between the header top and bottom faces 88B and 88H. A second opening 88E extends partly through the header body 88A and communicates with a cross-bore opening 88I, which in turn communicates with the chip carrier 84 by a substantially vertical bore 88J.

As best shown in FIG. 10, the illustrated chip carrier 84 has a dielectric body that mounts a pressure sensing element 89. Similar to the planar embodiment and bi-planar embodiment as described in the '927 patent, this cross-sectional view of the sensing assembly 80 includes the fill tube 92 diagrammatically relocated for clarity of discussion. A set of electrical pins 84B, FIG. 4, is connected by wire bonds to the contacts of the sensing element 89 and extends upwardly from the top surface 84C.

Also as described with reference to the embodiments of the '927 patent, the mounting sheet 86 seats over the chip carrier top surface 84C, and when heated to a selected elevated temperature, hermetically seals the chip carrier 84 to the header 88. The chip carrier 84 and the sheet 86 mount within the rectangular cavity 88G, and the electrical pins 84B extend upward and through the header holes 88C that aperture the top face 88B. The electrical insulator cap 90 can mount over the pins 84B to center the pins within the chip carrier holes, and to electrically isolate the pins from the header 88.

The overrange diaphragm 82, which can be formed with concentric convolutions in registration with the circular ridges or convolutions of the floor 118D of the mounting portion 118C, is secured, for example, by welding along the periphery, to the header bottom face 88H. The diameter of the diaphragm 82 is closely equal to the outer diameter of the header 88.

In the illustrated embodiment of the bi-planar transmitter of FIG. 4, the sensing assembly 80 seats in the annular mount 118C and the overrange diaphragm 82 overlies the first pressure passageway 134 (FIG. 10). Similar to the embodiments of the '927 patent, this configuration places the diaphragm proximate to both the chip carrier 84 and the housing 108. The sensing assembly 80 is then secured and sealed to the annular mount 118C.

An electrical contact plate 328, which assembles onto the header 88, has a series of transducer holes 328A and a set of peripheral notches 328B, 328C, and 328D. A flexible electrical cable 330 is coupled at one end to the top plate 328 and extends upwardly therefrom. When the plate is properly positioned for assembly, the notches 328B, 328C and 328D are aligned to receive the fill tubes 94, 96 and 92, respectively. The transducer holes 328A seat over the portions of the electrical pins that extend beyond the insulator cap 90. The contact plate provides a secure electrical connection to the electrical pins 84B and thus to the sensing element 89. The flexible cable 330 carries the output electrical signals generated by the sensing element in response to pressure differences applied to the diaphragms 200A and 200B, to the associated electronic circuitry mounted within the housing 108.

Referring again to FIGS. 4 and 10, the fill tube 92 seats in the third opening 88F in the header 88, and the tube 94 seats in the second opening 88E. The U-shaped tube 96 has one end that seats in the first opening 88D and a second end that mounts to the protrusion 144A of the flame arrestor 144. The fill tubes 92 and 94, and openings 88F and 88E, respectively, provide structure for filling the high and low pressure sides of the transmitter 100 with fill fluids. In addition, FIG. 10 illustrates that a potting material 276 is cast within the sleeve 132 and embeds the sensing assembly 80 in the mount 118C. The potting material fills the volume within the sleeve 132 and protects the sensing assembly 80 and its associated electrical leads from mechanical shock, vibrations, and like disturbances, and excludes moisture and corrosive agents.

As also shown in FIGS. 1 and 4, the illustrated housing 108 has a neck 108A that seats over the sleeve 132 by threaded attachment thereto, and that, in turn, carries a housing portion 108B. The housing portion 108B can be divided into first and second internal compartments (not shown) and has a sealed opening that extends between the compartments. The illustrated housing portion 108B has a removable and replaceable cover 108H, 108H at each end, i.e. On the left side and on the right side in FIG. 1, that can be sealed to the housing with a deformable gasket (not shown), to provide access to each internal compartment. The removable covers 108H, 108H allow a customer or maintenance personnel to connect the casing electronics to remote processing circuitry, as well as allow access to the housing electronics for testing and/or repair.

The flexible electrical cable 330, electrically connected at one end to the sensing assembly 80, extends upwardly into the housing 108 through the neck 108A and connects to the housing electronics. Typically, one cover has an optical window through which an output display can be viewed. In an embodiment, the resident housing electronics includes resident software code and a receiver that allows a system operator, via a remote digital logic module transmitter, to electronically switch the high and low pressure sides of the pressure transmitter 100.

With reference to FIG. 1, the housing, or casing 108 can further include a boss structure 108C having a threaded throughbore 19D that forms a dormer-like structure. The boss structure 108C allows access to the casing interior when it may be necessary to perform field tests. The throughbore 108D provides structure through which the casing electronics can be connected to the remote processing circuitry. A second boss structure can be present on the opposite side of the casing 108 as an alternate connection port.

Figure 11A:
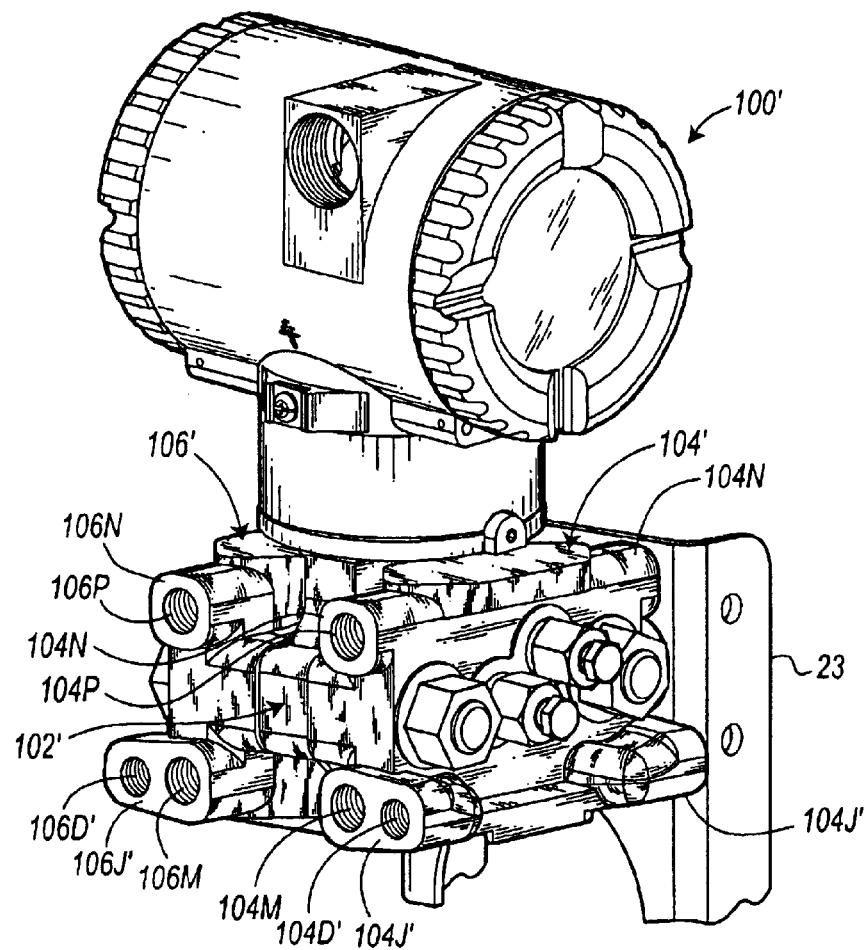
FIG. 11A is a perspective view of a pressure transmitter according to one embodiment of the disclosed differential pressure transmitter, with associated mounting hardware.
Figure 11B:
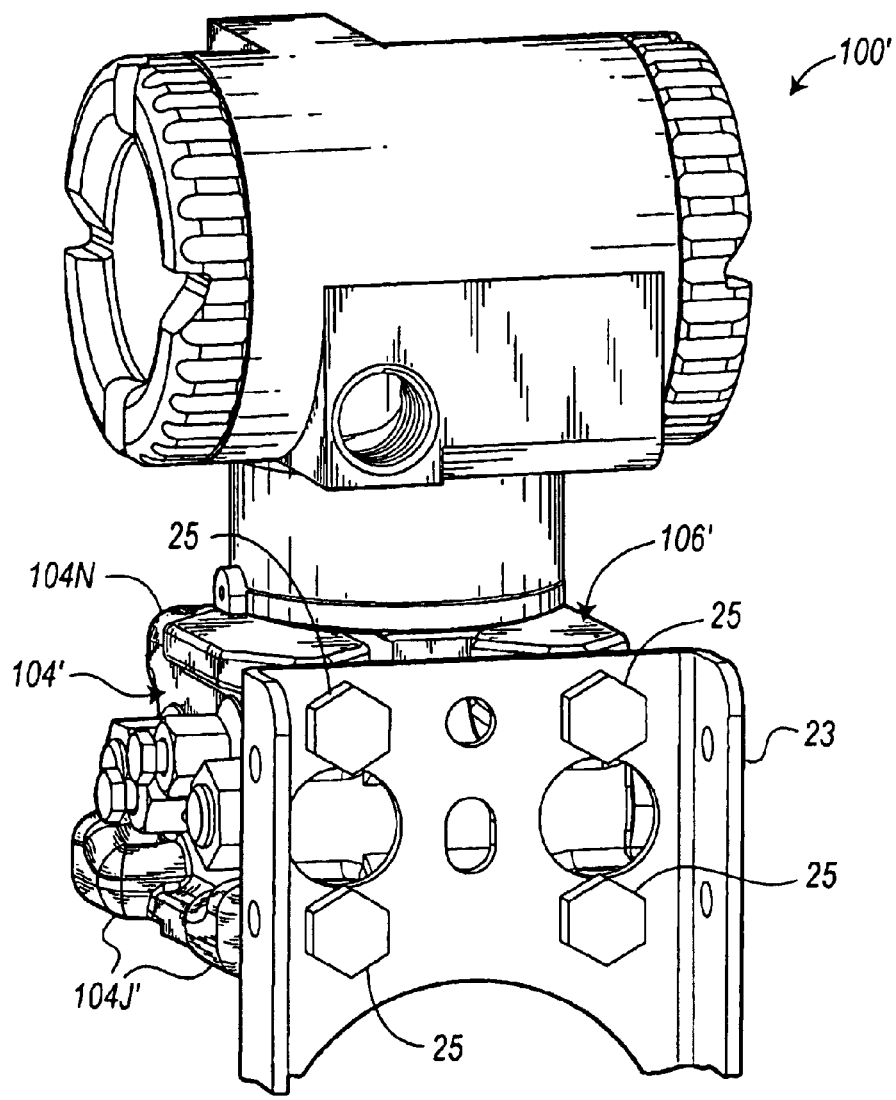
FIG. 11B is a perspective view of a pressure transmitter of FIG. 11A from a reverse direction.

Referring now to FIGS. 11A and 11B, there is shown an embodiment of a bi-planar differential pressure transmitter 100', having the features as described for bi-planar differential pressure transmitter 100 of FIGS. 1–10, and including additional mounting extensions and bolt holes for accommodating various mounting brackets. FIG. 11A illustrates transmitter 100' generally in the same orientation as transmitter 100 of FIG. 1. For ease of illustration and description, those features of transmitter 100' in common with transmitter 100 are referred to by corresponding reference numerals.

Flanges 104' and 106' include knobbed extensions 104J' and 106J', as previously described. In addition to bolt holes 104D' and 106D', knobbed extensions 104J' and 106J' have each been enlarged in a direction towards unitary body portion 102' to accommodate a second set of blind bolt holes 104M, 106M. Alternately and/or in addition to knobbed extensions 104J' and 106J', flanges 104' and 106' can each include a second pair of extensions 104N, 106N having respective blind bolt holes 104P, 106P. In the illustrative embodiment of FIG. 11A, transmitter 100' is shown mounted on bracket 23.

FIG. 1B is a view of the transmitter 100' from a reverse direction, illustrating four bolts 25 passing through bracket 23 to engage with bolt holes 104M, 104P, 106M, 106P in respective flanges 104', 106'. Bolt holes 104M, 106M are shown in FIGS. 11A and 11B as horizontally aligned with bolt holes 104D', 106D'. Also, bolt holes 104P, 106P of extensions 104N, 106N are shown vertically aligned with respective bolt holes 104M, 106M. However, other configurations and locations of extensions 104N, 106N and bolt holes 104M, 104N, 106M, 106N can be provided to accommodate other mounting brackets as may be standard in the industry.

Figure 12:
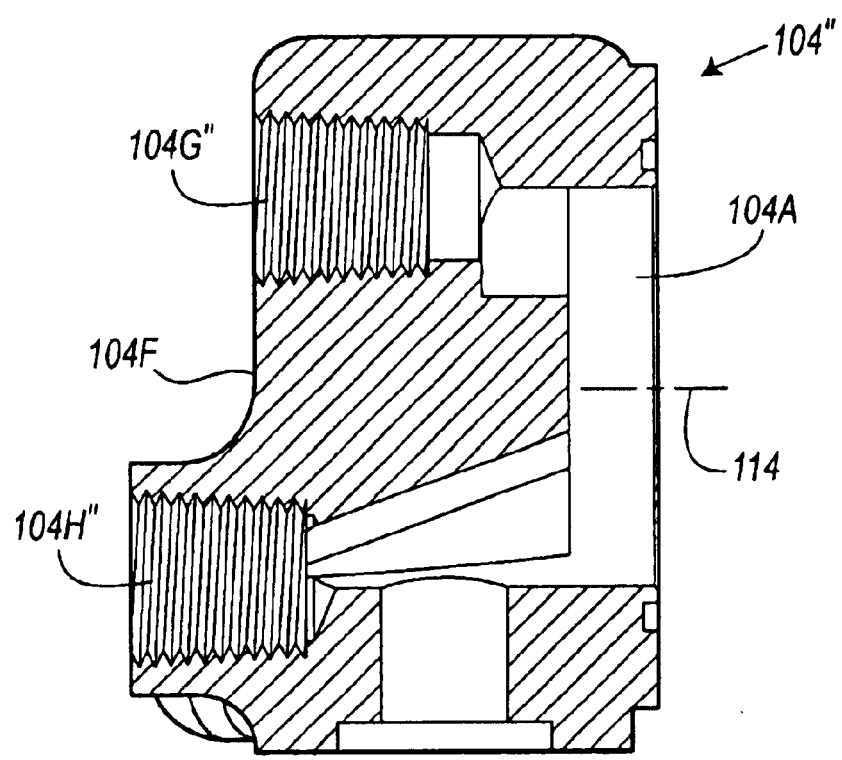
FIG. 12 is a cross-sectional view of a flange element having vertically aligned passageways.

FIG. 12 shows an embodiment of a flange element 104" having a first threaded passageway 104G" and a second threaded passageway 104H" extending from peripheral face 104F to the chamber 104A. The two passages 104G", 104H" of the flange 104" extend along axes parallel to axis 114 and perpendicular to axis 152 (not shown in FIG. 12). For the orientation shown in FIG. 12, passage 104G" intersects the chamber 104A at the periphery of chamber 104A at a point above axis 114 and passage 104H" intersects the periphery of chamber 104a at a point below axis 114. By intersecting chamber 104a at its periphery, passages 104G", 104H" can provide full venting and draining of chamber 104a. Passages 106G", 106H" of a flange element 106" (not shown in FIG. 12) can be similarly configured, though flanges with differing passageway configurations can be provided.

The structures of the illustrated embodiments attain pressure transmitters that are compact, relatively lightweight and relatively low in cost. The pressure transmitters can also mount a read-out display positioned for relatively easy viewing. Furthermore, at least one transmitter embodiment attains large process diaphragms in a compact transmitter size by employing only a pair of bolts along a horizontal axis. This configuration accommodates large process diaphragms without increasing the overall size of the transmitter.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

It can thus be seen that the disclosed differential pressure transmitter efficiently attains the objects set forth above, among those made apparent from the preceding description. Since certain changes may be made in the above constructions without departing from the scope of the disclosed differential pressure transmitter, it is intended that all matter contained in the above description or shown in the accompanying drawings be interpreted as illustrative and not in a limiting sense.

It is also to be understood that the following claims are to cover all generic and specific features of the disclosed differential pressure transmitter described herein, and all statements of the scope of the disclosed differential pressure transmitter, which, as a matter of language, might be said to fall therebetween. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A pressure transmitter apparatus comprising:
   A. unitary body having, in a first orientation,
   (1) a vertical surface extending along a first vertical axis and apertured with first and second pressure openings disposed at substantially the same vertical location along a first horizontal axis on opposed faces of said vertical surface, and
   (4) a transducer mounting coupled to said body and located, in said first orientation, vertically above said pressure openings, B. a diaphragm forming first and second process diaphragms respectively closing said first and second pressure openings, C. first and second flanges removably and replaceably secured to said body overlying said diaphragm, said first and second flange apertured to form respective first and second pressure chambers adjacent said diaphragm, said first and second flange forming respective first and second pressure ports extending vertically within said first and second flange to intersect with said first and second pressure chambers for coupling first and second pressure inputs to said first and second process diaphragms, respectively, D. first and second pressure passages vertically extending at least partly within said body for communicating respectively between said first and second pressure openings and said transducer mounting, where each of said first and second flanges includes a selectively closed first passageway extending horizontally within said first and second flanges to intersect with said first and second pressure chambers, respectively, and being offset vertically and horizontally from said first horizontal axis, and where each of said first and second flanges includes a selectively closed second passageway extending horizontally within said first and second flanges to intersect with said first and second pressure chambers, respectively, and being offset horizontally from said first horizontal axis opposite from said first passageway, such that at least one of said first passageway and said second passageway are disposed for at least one of purging gas and draining liquid based on the orientation of said transmitter apparatus.

2. A pressure transmitter apparatus according to claim 1, where the pressure transmitter apparatus is mounted in at least one of:

a first orientation having said first passageway disposed for purging gas and said second passageway disposed for draining liquid, and, a second orientation where said first passageway is disposed for draining liquid and said second passageway is disposed for purging gas, said second orientation being rotated one hundred eighty degrees about said first horizontal axis from said first orientation.

3. A pressure transmitter apparatus according to claim 2, where the pressure transmitter apparatus is mounted in at least one of:

a third orientation having said first passageway disposed for purging gas and said first and second pressure ports disposed for draining liquid, said third orientation rotated ninety degrees about said first horizontal axis from said first orientation, and, a fourth orientation having said first passageway disposed for draining liquid and said first and second pressure ports disposed for purging gas, said fourth orientation rotated one hundred eighty degrees about said first horizontal axis from said third orientation.

4. A pressure transmitter apparatus according to claim 1, further comprising a flame retardant disposed within at least one of said vertically extending first and second pressure passages and located above said pressure openings which extend generally horizontally, and at least partly within said unitary body, for introducing a flame barrier between said transducer mounting and said pressure openings.

5. A pressure transmitter apparatus according to claim 1, wherein said unitary body has a neck interconnecting said transducer mounting with said vertical surface providing thermal isolation therebetween.

6. A pressure transmitter apparatus according to claim 1, wherein said transducer mounting comprises:

a sensor located, in said first orientation, above said pressure openings and in fluid communication with said first and second passages, and a sensor mounting for mounting said sensor.

7. A pressure transmitter apparatus according to claim 6, further comprising a circuit connected with said sensor and selectively operable for electronically designating which of said first and second pressure inputs is a high pressure input.

8. A pressure transmitter apparatus according to claim 6, wherein said sensor comprises:

a housing having opposed and substantially parallel first and second faces that are transverse to said first axis and that are axially spaced apart along said first axis, in said first orientation, and a transducer, located at least partly between said first and second faces, for generating a signal in response to the difference in pressure between said first and second pressure inputs applied to said first and second pressure ports.

9. A pressure transmitter apparatus according to claim 8, wherein said sensor further comprises an overrange protection overlying said second face of said housing and arranged in fluid communication with said first and second pressure passages, for protecting said transducer from an overrange pressure condition, said overrange protection overlying at least said first pressure passage and integrally arranged with said housing of said sensor.

10. A pressure transmitter apparatus according to claim 1, wherein said transducer mounting comprises an annular support structure for mounting a sensor assembly and which extends, in said first orientation, along said first vertical axis.

11. A pressure transmitter apparatus according to claim 10, wherein said transducer mounting further comprises a flat face disposed substantially orthogonal to said first vertical axis in said first orientation, and from which said annular support extends, wherein one of said first and second pressure passages opens onto said face and within said annular support structure and wherein said other of said first and second pressure passages opens onto said flat face external of said annular support structure.

12. A pressure transmitter apparatus according to claim 11, further comprising a pressure sensor assembly coupled to said transducer mounting and disposed in fluid communication with at least one of said first and second pressure passages, and having overrange protection for protecting against an overrange pressure condition coupled to at least one of said pressure passages, said pressure sensor assembly being adapted for mounting within said annular support structure such that said overrange protection overlies said pressure passage opening onto said flat face within said annular support structure.

13. A pressure transmitter apparatus according to claim 1, wherein said transducer mounting comprises horizontal annular surface coupled to said unitary body and located, in said first orientation, vertically above said pressure openings, said horizontal annular surface including:

a transducer element seating, and a connection for mounting an electronics housing to said horizontal surface.

14. A pressure transmitter apparatus according to claim 13, wherein said connection includes a stepped annular surface for seating said electronics housing.

15. A pressure transmitter apparatus according to claim 13, wherein said transducer element seating includes an annular transducer mount integrally formed on said horizontal annular surface and extending outwardly from said transducer element seating.

16. A pressure transmitter apparatus according to claim 1, further comprising a pressure sensor assembly coupled to said transducer mounting and disposed in fluid communication with at least one of said first and second pressure passages, and having overrange protection for protecting against an overrange pressure condition coupled to at least one of said pressure passages.

17. A pressure transmitter apparatus according to claim 16, wherein said pressure sensor assembly comprises:
- a housing having opposed and substantially parallel first and second faces that are transverse to said first axis and that are axially spaced apart along said first axis, in said first orientation, and
- a pressure sensing element, located at least partly between said first and second faces, for generating a signal in response to the difference in pressure between said first and second pressure inputs applied to said first and second pressure ports.

18. A pressure transmitter apparatus according to claim 17, wherein said overrange protection overlies said second face of said housing and is arranged in fluid communication with said first and second pressure passages, for protecting said pressure sensing element from an overrange pressure condition.

19. A pressure transmitter apparatus according to claim 1, further comprising overrange-protected sensor for producing an electrical signal responsive to first and second pressure conditions applied thereto, said sensor being seated with said mounting in fluid communication with at least one of said pressure passages.

20. A pressure transmitter apparatus according to claim 19, further comprising:
- at least first and second fastener apertures, each extending horizontally, when in said first orientation, through said body and said first and second flanges, said apertures being horizontally spaced apart and disposed below said transducer mounting and below said sensor, and
- first and second threaded fasteners, each passing within the same-numbered fastener aperture for securing said body and said first and second flanges when assembled together.

21. A pressure transmitter apparatus according to claim 1, further comprising:
- apertures in both said body and said first and second flanges for mounting a plurality of fasteners, said apertures in said first and second flanges being disposed in registration with said apertures in said body when mounted together to facilitate seating of said fasteners, and
- fastener shrouding on said body and said first and second flanges and shroudingly enclosing said fasteners in the aperture thereof throughout engagement with said first and second flanges and with said body.

22. A pressure transmitter apparatus according to claim 1, further comprising:
- a seal engaged between said diaphragm and said first and second flanges for sealing each pressure port with respect to one process diaphragm, and
- first and second weld connections, each sealingly securing the same-numbered process diaphragm to said body at said same-numbered pressure opening, each said weld connection being isolated from contact with fluids at said pressure inputs by said seal.

23. A pressure transmitter apparatus according to claim 1, further comprising a first and a second flame arrestor vertically disposed respectively in said first and second pressure passages, for introducing flame barriers between said transducer mounting and said pressure openings.

24. A pressure transmitter apparatus according to claim 1, wherein said opposed faces of said vertical surface include a pair of parallel surface elements spaced apart in a direction orthogonal to said first axis, and said first and second pressure openings are oppositely arranged and substantially parallel to each other and said pressure passages are formed within said body between said surface elements.

25. A pressure transmitter apparatus according to claim 24, wherein said first and second flanges comprises a cover forming first and second process covers overlying said first and second process diaphragms, respectively, each said process cover being apertured with at least one fastener-receiving opening.

26. A pressure transmitter apparatus according to claim 25, wherein said diaphragm further comprises:
- a pair of diaphragm sheets forming first and second process isolation diaphragms respectively closing said first and second pressure openings formed, and
- a pair of weld plates each having an aperture dimensioned and sized to define the first and second process diaphragms, each said weld plate being configured to overlie each said diaphragm sheet and for mounting between said vertical surface and one of said first and second flanges when said pressure transmitter is assembled.

27. A pressure transmitter apparatus according to claim 24, further comprising:
- a plural bolt-type fastener for removably and replaceably securing said first and second flanges to said body,
- a first shroud formed on said body for shroudingly enclosing at least a selected length of each said bolt-type fastener, and
- a second shroud formed on each of said first and second flanges shroudingly enclosing at least a selected length of each said bolt-type fastener, said first and second shrouds, in combination, shroud nearly the entire length of said fastener.

28. A pressure transmitter apparatus according to claim 27, wherein said fastener for removably and replaceably securing said first and second flanges to said body includes two threaded fasteners, each extending through said first and second flanges and said body.

29. A pressure transmitter apparatus according to claim 24, further comprising overrange-protected sensor for producing an electrical signal responsive to first and second pressure conditions applied thereto, said sensor being seated with said mounting in fluid communication with at least one of said pressure passages.

30. A pressure transmitter apparatus according to claim 1, further comprising:
- an upwardly extending neck portion of relatively low thermal conductivity, said transducer mounting being integrally formed with said neck portion to be relatively thermally isolated from and located above said pressure openings, said first and second diaphragms respectively sealing said pressure openings on said vertical surface, and
- a differential pressure sensor secured on said transducer mounting and disposed, in said first orientation, above said pressure openings, wherein said first and second passages communicate respectively between said first and second pressure openings and said differential pressure sensor, for separately communicating to said sensor first and second pressures responsive to pressures applied to said first and second pressure ports.

31. A pressure transmitter apparatus according to claim 1, wherein said first and second flanges are interchangeable.

32. A pressure transmitter apparatus according to claim 1, further comprising flange mounting extending from each of said first and second flange for mounting said pressure transmitter apparatus to at least one mounting bracket.

33. A pressure transmitter apparatus according to claim 32, wherein said flange mounting further comprise at least two threaded bores to receive mounting bolts of said at least one mounting bracket, said bores extending horizontally and perpendicularly to said first horizontal axis into opposite faces of each of said first and second flanges.

34. A pressure transmitter apparatus according to claim 32, wherein said flange mounting further comprise at least two sets of threaded bores spaced apart on said flange mounting, each set to receive mounting bolts of said at least one mounting bracket, each of said sets having bores extending horizontally and perpendicularly to said first horizontal axis into opposite faces of each of said first and second flanges.

35. A pressure transmitter apparatus according to claim 34, wherein at least one of said sets of threaded bores is spaced apart vertically from others of said sets.

36. A pressure transmitter apparatus according to claim 1, wherein said first and second flanges further comprise process connections for connecting said first and second pressure inputs to said first and second flanges, respectively.

37. A pressure transmitter apparatus according to claim 1, wherein said first passageway comprises a flared termination at said respective first and second pressure chambers, said flared termination extending radially about said first horizontal axis such that said flared termination in said first orientation extends vertically from said first horizontal axis opposite said respective first and second pressure ports, and extends horizontally from said first horizontal axis opposite said second passageway.

38. A pressure transmitter apparatus comprising:
a unitary body having, in a first orientation, first and second pressure openings disposed at substantially the same vertical location along a first horizontal axis on opposed vertical faces of said body,
a transducer mounting coupled to said body and located, in said first orientation, vertically above said pressure openings,
a first and a second pressure passage vertically extending at least partly within said body for communicating respectively between said first and second pressure openings and said transducer mounting,
diaphragm forming first and second process diaphragms respectively closing said first and second pressure openings,
first and second flanges removably and replaceably secured, respectively, to said opposed vertical faces of said body, and overlying said diaphragm, said first and second flanges apertured to form respective first and second pressure chambers adjacent said diaphragm, said first and second flanges forming respective first and second pressure ports extending vertically within said first and second flanges to intersect with said first and second pressure chambers for coupling first and second pressure inputs to said first and second process diaphragms, respectively,
wherein each of said first and second flanges includes a selectively closed first passageway extending horizontally within said first and second flanges to intersect with said first and second pressure chambers, respectively, and being offset vertically and horizontally from said first horizontal axis, said first passageway having a flared termination at said respective first and second pressure chambers, said flared termination extending radially about said first horizontal axis such that said flared termination in said first orientation extends vertically from said first horizontal axis opposite said respective first and second pressure ports, and extends horizontally from said first horizontal axis opposite said second passageway,
wherein each of said first and second flanges includes a selectively closed second passageway extending horizontally within said first and second flanges to intersect with said first and second pressure chambers, respectively, and being offset horizontally from said first horizontal axis opposite from said first passageway, said first and second passageways in combination with said first and second pressure ports disposed for purging gas and draining liquid when in one of said first orientation and a second orientation, rotated one-hundred eighty degrees about said first horizontal axis from said first orientation, said first and second passageways alternately disposed for purging gas and draining liquid when said transmitter apparatus is mounted in one of a third orientation rotated ninety degrees about said first horizontal axis from said first orientation and a fourth orientation rotated one-hundred eighty degrees about said first horizontal axis from said third orientation.

39. A pressure transmitter apparatus according to claim 38, further comprising:
at least first and second fastener apertures, each extending horizontally, when in said first orientation, through said body and said first and second flanges, said apertures being horizontally spaced apart and disposed below said transducer mounting,
at least first and second threaded fasteners, each passing within said respective fastener aperture for securing said body and said first and second flanges when assembled together, and
a fastener shrouding on said body and said first and second flanges and shroudingly enclosing said fasteners in the aperture thereof throughout engagement with said first and second flanges and with said body.

40. A pressure transmitter apparatus according to claim 38, further comprising a flame retardant disposed within at least one of said vertically extending first and second pressure passages and located above said pressure openings which extend generally horizontally, and at least partly within said unitary body, for introducing a flame barrier between said transducer mounting and said pressure openings.

41. A pressure transmitter apparatus according to claim 38, further comprising a pressure sensor assembly coupled to said transducer mounting and disposed in fluid communication with at least one of said first and second pressure passages, and having overrange protection for protecting against an overrange pressure condition coupled to at least one of said pressure passages.

42. A pressure transmitter apparatus according to claim 38, wherein said first and second flanges further comprise at least first and second threaded bores extending horizontally and perpendicularly to said first horizontal axis into opposed faces of each of said first and second flange, said threaded bores for receiving mounting bolts of at least one mounting bracket for mounting said pressure transmitter apparatus to said at least one mounting bracket.

43. A pressure transmitter apparatus according to claim 38, wherein said first and second flanges further comprise process connections connecting said first and second pressure inputs to said first and second flanges, respectively.

44. A pressure transmitter apparatus according to claim 38, wherein said first and second flanges further comprise at least two spaced apart sets of first and second threaded bores extending horizontally and perpendicularly to said first horizontal axis into opposed faces of each of said first and second flanges, each of said sets for receiving mounting bolts of a mounting bracket for mounting said pressure transmitter apparatus to said mounting bracket.

45. A pressure transmitter apparatus comprising:
a unitary body having, in a first orientation, first and second pressure openings disposed at substantially the same vertical location along a first horizontal axis on opposed vertical faces of said body,
a transducer mounting coupled to said body and located, in said first orientation, vertically above said pressure openings,
a first and a second pressure passage vertically extending at least partly within said body for communicating respectively between said first and second pressure openings and said transducer mounting,
diaphragm forming first and second process diaphragms respectively closing said first and second pressure openings,
first and second flanges removably and replaceably secured, respectively, to said opposed vertical faces of said body, and overlying said diaphragm, said first and second flanges apertured to form respective first and second pressure chambers adjacent said diaphragm, said first and second flanges forming respective first and second pressure ports extending vertically within said first and second flanges to intersect with said first and second pressure chambers for coupling first and second pressure inputs to said first and second process diaphragms, respectively,
wherein each of said first and second flanges includes a selectively closed first passageway extending horizontally within said first and second flanges and being offset vertically from said first horizontal axis opposite said respective first and second pressure ports to intersect with a periphery of said first and second pressure chambers, respectively, and disposed for purging gas from said pressure chambers when in said first orientation,
wherein each of said first and second flanges includes a selectively closed second passageway extending horizontally within said first and second flanges to intersect with a periphery of said first and second pressure chambers, being offset opposite from said first passageway, said second passageway disposed for draining liquid when in said first orientation.

46. A pressure transmitter apparatus according to claim 45, further comprising:
a flared termination of said first passageway at said respective first and second pressure chambers, said first passageway being offset horizontally from said first horizontal axis, said flared termination extending radially about said first horizontal axis such that said flared termination in said first orientation extends vertically from said first horizontal axis opposite said respective first and second pressure ports, and extends horizontally from said first horizontal axis opposite said second passageway, said second passageway being offset horizontally from said first horizontal axis opposite from said first passageway,
wherein said first and second passageways in combination with said first and second pressure ports are disposed for purging gas and draining liquid when in one of said first orientation and a second orientation, rotated one-hundred eighty degrees about said first horizontal axis from said first orientation, said first and second passageways alternately disposed for purging gas and draining liquid when said transmitter apparatus is mounted in one of a third orientation rotated ninety degrees about said first horizontal axis from said first orientation and a fourth orientation rotated one-hundred eighty degrees about said first horizontal axis from said third orientation.

47. A pressure transmitter apparatus according to claim 46, further comprising:
at least first and second fastener apertures, each extending horizontally, when in said first orientation, through said body and said first and second flanges, said apertures being horizontally spaced apart and disposed below said transducer mounting,
at least first and second threaded fasteners, each passing within said respective fastener aperture for securing said body and said first and second flanges when assembled together, and
a fastener shrouding on said body and said first and second flanges and shroudingly enclosing said fasteners in the aperture thereof throughout engagement with said first and second flanges and with said body.

48. A pressure transmitter apparatus according to claim 46, further comprising a flame retardant disposed within at least one of said vertically extending first and second pressure passages and located above said pressure openings which extend generally horizontally, and at least partly within said unitary body, for introducing a flame barrier between said transducer mounting and said pressure openings.

49. A pressure transmitter apparatus according to claim 46, further comprising a pressure sensor assembly coupled to said transducer mounting and disposed in fluid communication with at least one of said first and second pressure passages, and having overrange protection for protecting against an overrange pressure condition coupled to at least one of said pressure passages.

50. A pressure transmitter apparatus according to claim 46, wherein said first and second flanges further comprise at least first and second threaded bores extending horizontally and perpendicularly to said first horizontal axis into opposed faces of each of said first and second flange, said threaded bores for receiving mounting bolts of at least one mounting bracket for mounting said pressure transmitter apparatus to said at least one mounting bracket.

51. A pressure transmitter apparatus according to claim 46, wherein said first and second flanges further comprise process connections connecting said first and second pressure inputs to said first and second flanges, respectively.

52. A pressure transmitter apparatus according to claim 46, wherein said first and second flanges further comprise at least two spaced apart sets of first and second threaded bores extending horizontally and perpendicularly to said first horizontal axis into opposed faces of each of said first and second flanges, each of said sets for receiving mounting bolts of a mounting bracket for mounting said pressure transmitter apparatus to said mounting bracket.

* * * * *